(12) United States Patent
Arunachalam et al.

(10) Patent No.: US 12,666,351 B2
(45) Date of Patent: Jun. 23, 2026

(54) DNS-BASED DISCOVERY OF MMES IN AN MME POOL

(71) Applicant: T-Mobile USA, Inc., Bellevue, WA (US)

(72) Inventors: Kameswaran Arunachalam, Redmond, WA (US); Kunal Prakash Barawkar, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 294 days.

(21) Appl. No.: 18/602,991

(22) Filed: Mar. 12, 2024

(65) Prior Publication Data

US 2025/0294437 A1 Sep. 18, 2025

(51) Int. Cl.
H04W 48/18 (2009.01)
H04L 61/4511 (2022.01)
H04W 60/04 (2009.01)

(52) U.S. Cl.
CPC ......... H04W 48/18 (2013.01); H04L 61/4511 (2022.05); H04W 60/04 (2013.01)

(58) Field of Classification Search
CPC .... H04W 48/18; H04W 60/04; H04L 61/4511
USPC ........................................................ 370/329
See application file for complete search history.

(56) References Cited

U.S. PATENT DOCUMENTS

| | | | | |
|---|---|---|---|---|
| 2009/0270099 A1 * | 10/2009 | Gallagher | ............... | H04W 8/08 |
| | | | | 370/352 |
| 2013/0121298 A1 * | 5/2013 | Rune | ................... | H04L 61/4511 |
| | | | | 370/329 |
| 2023/0199868 A1 * | 6/2023 | Kedalagudde | ........ | H04L 67/141 |
| | | | | 370/328 |
| 2025/0294437 A1 * | 9/2025 | Arunachalam | ....... | H04W 48/18 |
| 2025/0386381 A1 * | 12/2025 | Arunachalam | ....... | H04W 76/10 |
| 2026/0019131 A1 * | 1/2026 | Wang | ................... | H04B 7/0404 |

FOREIGN PATENT DOCUMENTS

| | | | | | |
|---|---|---|---|---|---|
| BR | PI1015128 B1 * | 6/2021 | ............. | H04W 8/02 |
| EP | 2375808 A1 * | 10/2011 | ........... | H04W 60/04 |
| EP | 3253090 B1 * | 7/2021 | ............. | H04W 8/08 |
| WO | WO-2013167160 A1 * | 11/2013 | ........... | H04W 76/19 |

* cited by examiner

*Primary Examiner* — Anthony Mejia
(74) *Attorney, Agent, or Firm* — Lee & Hayes, P.C.

(57) ABSTRACT

Described herein is a serving gateway (SGW) of a telecommunications network that is configured to receive from a first mobility management entity (MME) of an MME pool of the telecommunications network a request associated with a user equipment (UE). Subsequent to the receiving, the SGW determines the first MME or a link between first MME and SGW has failed. The SGW then queries a domain name service of the telecommunications network for a list of MMEs in the MME pool and selects a second MME from list of MMEs in the MME pool for a session with UE.

20 Claims, 4 Drawing Sheets

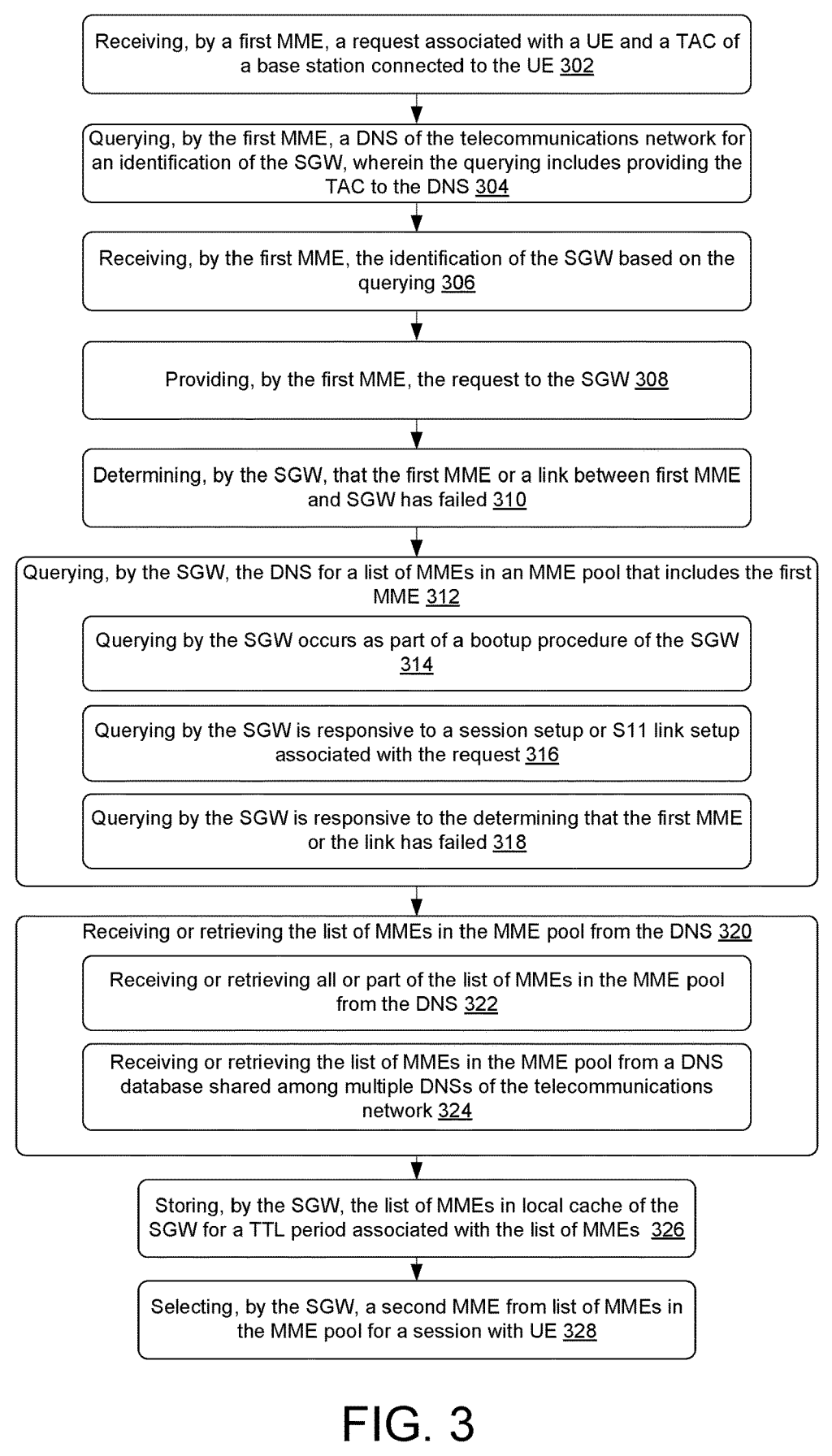

Receiving, by a first MME, a request associated with a UE and a TAC of a base station connected to the UE 302

Querying, by the first MME, a DNS of the telecommunications network for an identification of the SGW, wherein the querying includes providing the TAC to the DNS 304

Receiving, by the first MME, the identification of the SGW based on the querying 306

Providing, by the first MME, the request to the SGW 308

Determining, by the SGW, that the first MME or a link between first MME and SGW has failed 310

Querying, by the SGW, the DNS for a list of MMEs in an MME pool that includes the first MME 312

Querying by the SGW occurs as part of a bootup procedure of the SGW 314

Querying by the SGW is responsive to a session setup or S11 link setup associated with the request 316

Querying by the SGW is responsive to the determining that the first MME or the link has failed 318

Receiving or retrieving the list of MMEs in the MME pool from the DNS 320

Receiving or retrieving all or part of the list of MMEs in the MME pool from the DNS 322

Receiving or retrieving the list of MMEs in the MME pool from a DNS database shared among multiple DNSs of the telecommunications network 324

Storing, by the SGW, the list of MMEs in local cache of the SGW for a TTL period associated with the list of MMEs 326

Selecting, by the SGW, a second MME from list of MMEs in the MME pool for a session with UE 328

FIG. 3

DNS-BASED DISCOVERY OF MMES IN AN MME POOL

BACKGROUND

Network-initiated service restoration (NTSR) can involve detection of a failure by a node of a telecommunications network followed by an effort to restore service. In networks using pools of mobility management entities (MMEs) such as Fourth Generation (4G) networks, failure of an MME or of a link with an MME can result in service restoration using a different MME in the MME pool having the failed/link-failed MME. For instance, an MME can be connected to a serving gateway (SGW) over an S11 link and, with the SGW, service a session with a user equipment (UE). If the SGW determines that there is a failure of the MME or of the link (e.g., of the S11 link), the SGW must identify another MME from the MME pool associated with the failure and select that other MME for service restoration.

In some examples, each SGW is configured with static list(s) of MMEs, each of the static list(s) associated with an MME pool. A given SGW may be configured with several static list(s) of MMEs, and multiple SGWs can be configured with a given static list of MMEs. Any time a static list of MMEs needs to be changed (e.g., needs to have an MME added to or removed from a corresponding MME pool), each SGW must be individually reconfigured to reflect the change, substantially increasing the risk of mistake and, with it, increasing the likelihood of NTSR failure.

BRIEF DESCRIPTION OF THE DRAWINGS

The detailed description is set forth with reference to the accompanying figures. In the figures, the left-most digit(s) of a reference number identifies the figure in which the reference number first appears. The same reference numbers in different figures indicate similar or identical items.

FIG. 3 is a flow diagram of an illustrative process for determining a failure of an MME or MME link and querying a DNS for a list of MMEs of the MME pool that includes the failed/link-failed MME.

DETAILED DESCRIPTION

This disclosure is directed in part to SGW of a telecommunications network that is configured to receive, from a first MME of an MME pool of the telecommunications network, a request associated with UE. Subsequent to the receiving, the SGW determines the first MME or a link between first MME and SGW has failed. The SGW queries a DNS of the telecommunications network for a list of MMEs in the MME pool and selects a second MME from list of MMEs in the MME pool for a session with UE. Such querying of the DNS for the list of MMEs may occur at during a bootup procedure of the SGW, in response to receiving a request associated with a UE, or in response to determining that the first MME or link with the first MME has failed.

In some implementations, the SGW may be selected for the UE based on a tracking area code (TAC) of the base station that the UE is connected to. An MME, such as the first MME, may receive the request and the TAC code and may query the DNS, providing the TAC code. IN response, the MME may receive an identification of an SGW and may provide the request to the SGW.

Figure 1A:
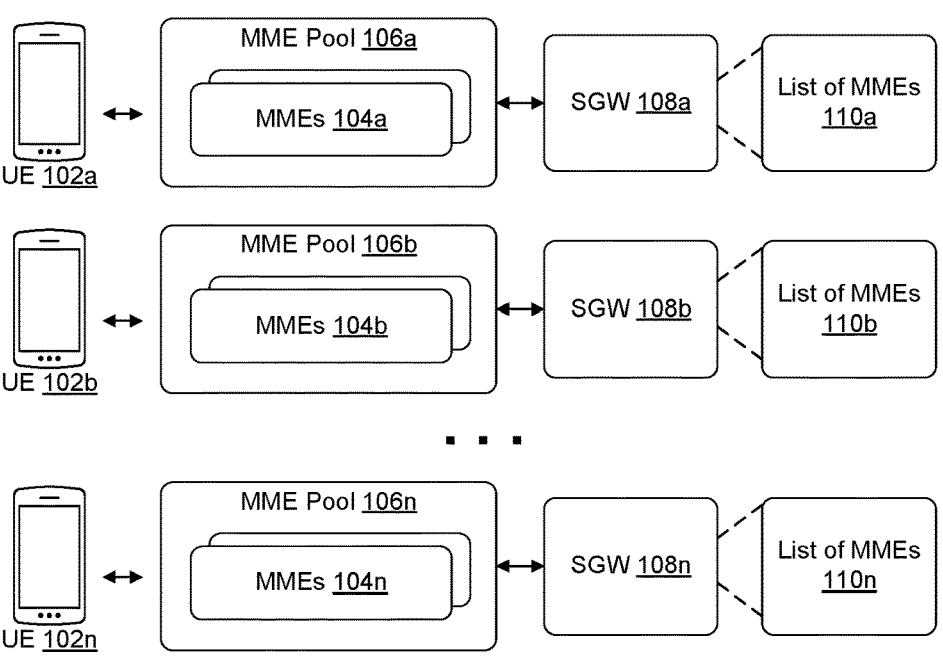
FIGS. 1A-1B are overview diagrams of different manners of configuring an SGW with lists of MMEs of an MME pool.
Figure 1B:
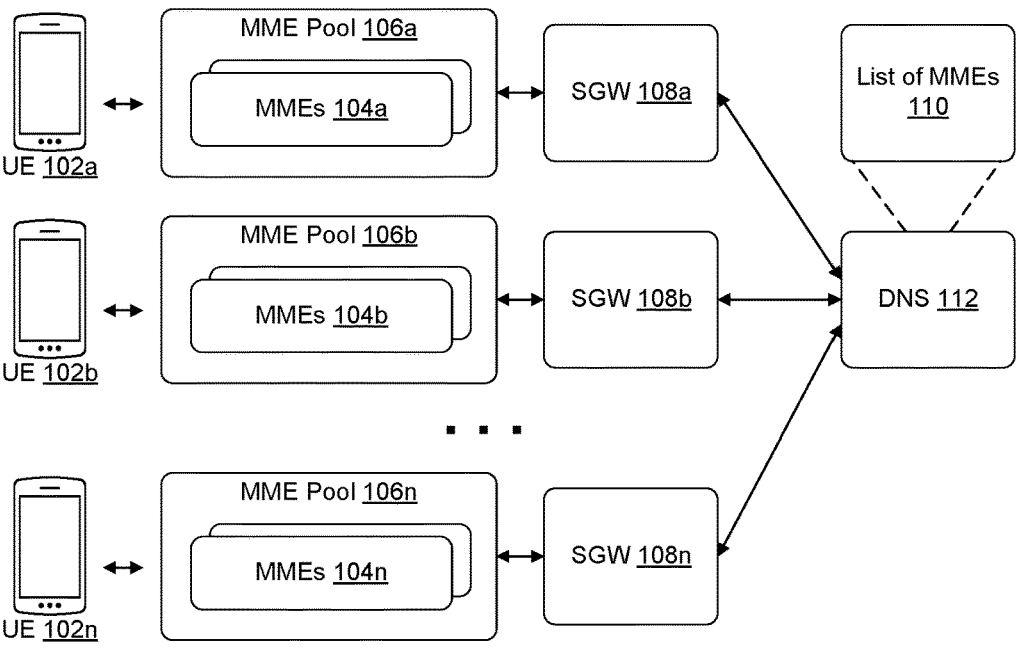

FIGS. 1A-1B are overview diagrams of different manners of configuring an SGW with lists of MMEs of an MME pool. FIG. 1A illustrates multiple instances of UEs 102 (e.g., 102(a), 102(b), . . . 102(n)) respectively connected to MMEs 104 (e.g., 104(a), 104(b), . . . 104(n)) of MME pools 106 (e.g., 106(a), 106(b), . . . 106(n)). An MME 104 may have a link to a SGW 108 (e.g., an S11 link). In some implementations, some or all of the MME pools 106 may be associated with different SGWs 108 (e.g., 108(a), 108(b), . . . 108(n)). Each SGW 108 may then be configured with a list of MMEs 110 (e.g., 110(a), 110(b), . . . 110(n)). When an update needs to be made to a list of MMEs 110, corresponding configuration updates (e.g., with updated lists of MMEs 110) may need to be made to multiple ones of the SGWs on an individual basis, with each update having independent risks of mistakes in entry, etc.

FIG. 1B illustrates SGW(s) 108 receiving or retrieving copies of a list of MMEs 110 from a DNS 112. Multiple instances of UEs 102 (e.g., 102(a), 102(b), . . . 102(n)) are respectively connected to MMEs 104 (e.g., 104(a), 104(b), . . . 104(n)) of MME pools 106 (e.g., 106(a), 106(b), . . . 106(n)). An MME 104 may have a link to a SGW 108 (e.g., an S11 link). In some implementations, some or all of the MME pools 106 may be associated with different SGWs 108 (e.g., 108(a), 108(b), . . . 108(n)). Unlike in FIG. 1A, each SGW 108 in FIG. 1B may receive or retrieve a list of MMEs 110 from DNS 112. When an update needs to be made to a list of MMEs 110, the list of MMEs 110 need only be updated in the DNS 112 (e.g., in a database of the DNS 112). The SGW(s) 108 may then receive or retrieve as needed from the DNS 112, avoiding the large amount of individual configuration and increased error risk of the manner of configured an SGW 108 shown and described with respect to FIG. 1A.

As described further herein, an SGW 108 of FIG. 1B may query the DNS 112 for the list of MMEs 110 in response to one or more different triggers. For example, an SGW 108 may receive or retrieve the list of MMEs 110 during a bootup procedure, in response to receiving a request associated with a UE 102, or in response to determining an MME 104 or link with an MME 104 has failed.

Figure 2:
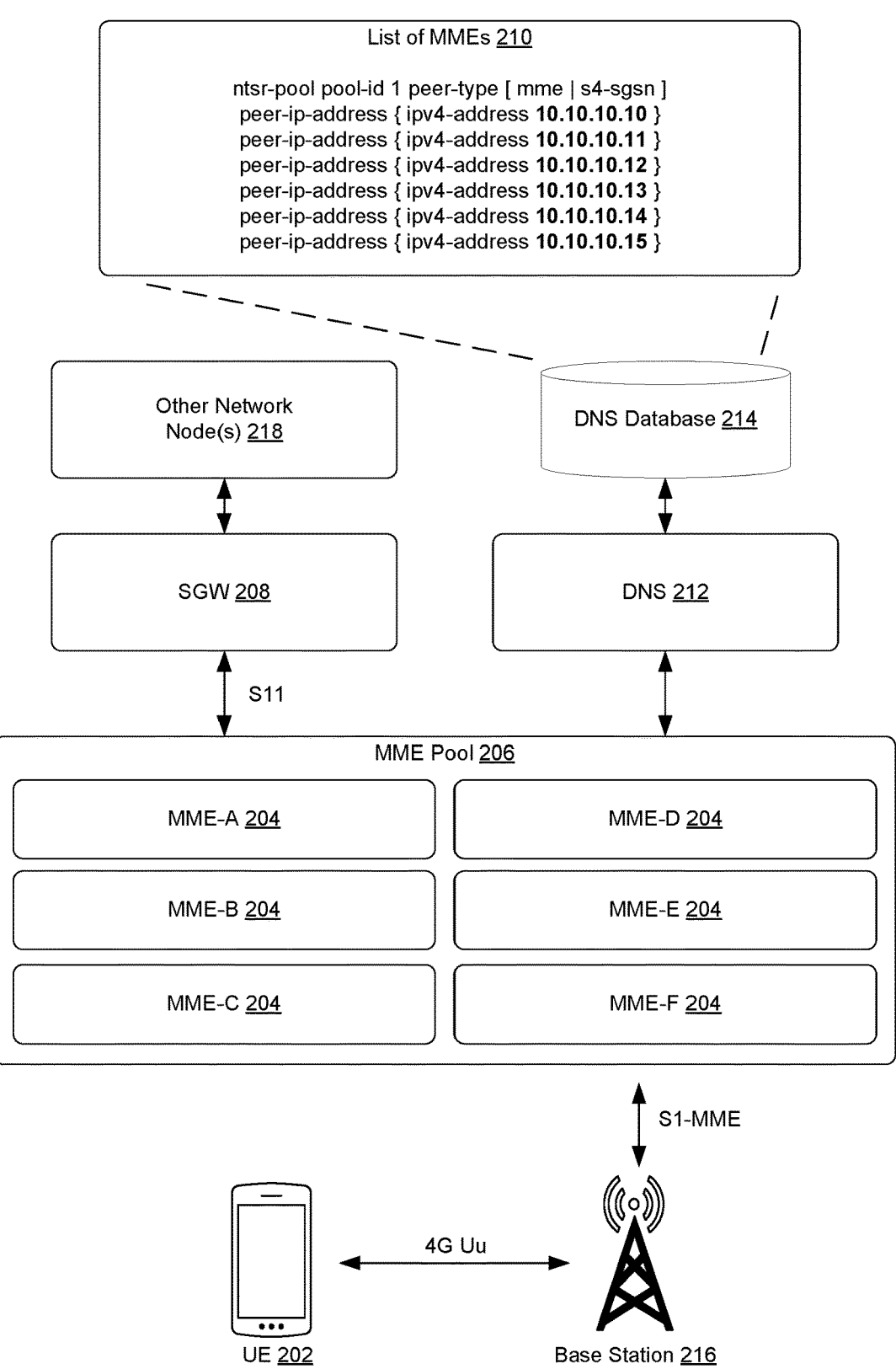
FIG. 2 is a network diagram of a telecommunications network with an SGW configured to retrieve a list of MMEs of an MME pool from a domain name service (DNS) of the telecommunications network.

FIG. 2 is a network diagram of a telecommunications network with an SGW configured to retrieve a list of MMEs of an MME pool from a DNS of the telecommunications network. As illustrated, a UE 202 is connected to a telecommunications network through an MME 204 in an MME pool 206, the MME 204 in turn connected through a SGW 208. The SGW 208 may be configured to obtain a list of MMEs 210 from the DNS 212, the list of MMEs 210 being stored in a DNS database 214 of the DNS 212. Further, in some examples, the UE 202 may be connected over an air interface with a base station 216, which may in turn have a wired or wireless connection, directly or indirectly, with MME 204. Also, the UE 202 may connect to other network nodes 218 of the telecommunication network through, e.g., the SGW 208, such as a packet data network gateway (PGW).

In various implementations, the UE 202 may be any sort of computing device capable of wireless communication such as a mobile phone, tablet computer, watch, goggles, Internet-of-Things (IoT) device, personal computer, etc. The UE 202 may be an example of a UE 102 (e.g., of UE 102(*a*), UE 102(*b*), . . . UE 102(*n*)). As shown in FIG. 2, the UE 202 may be connected to a base station 216 via a wireless connection over a radio frequency. In some examples, the base station 216 may be a 4G base station—an eNodeB (eNB) and the connection between the UE 202 and the base station 216 may be a 4G Uu connection.

The base station 216 may be connected to one or more MMEs 204 of the MME pool 206, either via wired or wireless mechanism(s), or a combination thereof. The base station 216 may also be associated with a physical location specified by a TAC and, when establishing a connection with a telecommunications network on behalf of a UE 202, the base station 216 may provide it TAC to the MME(s) 204. In some implementations, the connection(s) between the base station 216 and MME(s) 204 may be S1-MME connection(s).

The MMEs 204 of an MME pool 206 (e.g., MME-A 204, MME-B 204, MME-C 204, MME-D 204, MME-E 204, MME-F 204, etc.) may be physically or logically joined as the MME pool 206 and may serve as back-ups to each other when one of the MMEs 204 fails. An MME 204 (e.g., MME-A 204) receiving a connection or session initiation request from the UE 202 via the base station 216 may identify the TAC of the base station 216 and query a DNS 212 of the telecommunications network based on the TAC. The DNS 212 may maintain a mapping of TACs to SGWs 208 in its DNS database 214 and may reference the mapping upon receiving the query from the MME 204. The DNS 212 may then respond with an identification of an SGW 208, and the MME 204 may establish a link (e.g., an S11 link) with the identified SGW 208 in order to establish a bearer for a session between the UE 202 and the telecommunications network.

In various implementations, either the MME 204 (e.g., MME-A 204) associated with session/connection with the UE 202 or the link between that MME 204 and the SGW 208 may experience a failure. Such a failure may be detected or determined when the MME 204 does not respond to a heartbeat/keep-alive message or to other traffic (e.g., downlink traffic) from the telecommunications network. Following NTSR procedures, the SGW 208 may proceed with attempting to restore the session/connection by identifying and connecting with an alternative MME 204 (e.g., MME-F 204) of the MME pool 206. The SGW 208 may retrieve or already have a list of MMEs 210 for the MME pool 206 and may use the list of MMEs 210 to identify or select the alternative MME 204. The SGW 208 may then connect to the alternative MME 204 and proceeding with restoring the session.

As is further shown in FIG. 2, the SGW 208 may connect to the DNS 212 and receive or retrieve the list of MMEs 210 from the DNS 212 (e.g., from the DNS database 214). The SGW 208 may receive or retrieve the list of MMEs 210 responsive to any of a number of triggers. In some implementations, the SGW 208 can perform the query of the DNS 212 for the list of MMEs 210 during a bootup procedure for the SGW 208. In other or additional implementations, the SGW 208 can perform the query of the DNS 212 for the list of MMEs 210 during a session setup procedure or during an S11 setup procedure, with such a procedure occurring responsive to receiving the request associated with the UE 202. In other or further procedures, the SGW 208 can perform the query of the DNS 212 for the list of MMEs 210 in response to detecting/determining the failure of the MME 204 or of the link with the MME 204.

Upon receiving or retrieving the list of MMEs 210, the SGW 208 may store the list of MMEs in local cache/storage and may reference it in selecting an MME 204 from the MME pool 206 to replace a failed MME 204. In some implementations, the list of MMEs 210 of entries within the list may be associated with a time-to-live (TTL) after which the list of MMEs 210 or parts of it may be considered as no longer valid. Expiration of a TTL may be another trigger causing the SGW 208 to query the DNS 212 for the list of MMEs 210 (which may be the same or updated, but in either case with a reset TTL).

In various implementations, the SGW 208 may retrieve part of all of the list of MMEs 210. In some examples, the SGW 208 may retrieve only parts of the list of MMEs needed to identify a replacement MME 204 for the failed MME 204. In other examples, the list of MMEs 210 may have entries for several MME pools 206 and the SGW 208 may only retrieve a part of the list of MMEs 210 that involves the MME pool 206 which includes the failed MME 204.

In further embodiments, the DNS 212 may be one of multiple DNS instances that share the DNS database 214. By allowing one DNS database 214 to support multiple DNSs 212, the telecommunications network is able to update lists of MMEs 210 used across the network simply by updated a copy stored in the DNS database 214.

FIG. 3 illustrates an example process. This process is illustrated as logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 3 is a flow diagram of an illustrative process for determining a failure of an MME or MME link and querying a DNS for a list of MMEs of the MME pool that includes the failed/link-failed MME. As illustrated at 302, a first MME of an MME pool receives a request associated with a UE and a TAC of a base station connected to the UE.

At 304, the first MME queries a DNS of the telecommunications network for an identification of the SGW. In some implementations, the querying includes providing the TAC to the DNS.

At 306, the first MME receive the identification of the SGW based on the querying.

At 308, the first MME provides the request to the SGW, and the SGW receives the request from the first MME.

At 310, the SGW determines that the first MME or a link between first MME and SGW has failed.

At 312, the SGW queries the DNS for a list of MMEs in the MME pool that includes the first MME. At 314, the querying by the SGW may occur as part of a bootup procedure of the SGW. Additionally or alternatively, at 316, the querying by the SGW may be responsive to a session setup or S11 link setup associated with the request. Also additionally or alternatively, at 318, the querying by the SGW may be responsive to the determining that the first MME or the link has failed.

At 320, the SGW may receive or retrieve the list of MMEs in the MME pool from the DNS. At 322, the receiving or retrieving may comprise receiving or retrieving all or part of the list of MMEs in the MME pool from the DNS. At 324, the receiving or retrieving may comprise receiving or retrieving the list of MMEs in the MME pool from a DNS database shared among multiple DNSs of the telecommunications network. In some implementations, a change to the list of MMEs in the MME pool is made to a copy stored in the DNS database.

At 326, the SGW may store the list of MMEs in local cache of the SGW for a time-to-live (TTL) period associated with the list of MMEs.

At 328, the SGW selects a second MME from list of MMEs in the MME pool for a session with UE.

Figure 4:
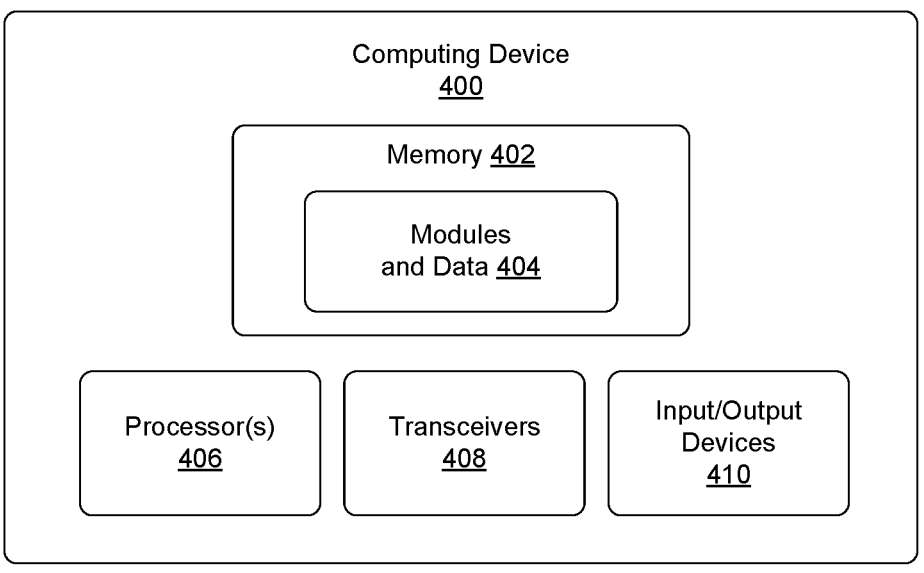
FIG. 4 is a schematic diagram of a computing device capable of implementing functionality of at least one of the MMEs or SGW of the telecommunications network.

FIG. 4 is a schematic diagram of a computing device capable of implementing functionality of at least one of the MMEs or SGW of the telecommunications network. As shown, the computing device 400 includes a memory 402 storing modules and data 404, processor(s) 406, transceivers 408, and input/output devices 410.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 402 can include one or more software or firmware elements, such as computer-readable instructions that are executable by the one or more processors 406. For example, the memory 402 can store computer-executable instructions associated with modules and data 404. The modules and data 404 can include a platform, operating system, and applications, and data utilized by the platform, operating system, and applications. Further, the modules and data 404 can implement any of the functionality for the UE 102, MMEs 104, the MME pool 106, SGW 108, DNS 112, the UE 202, MMEs 204, the MME pool 206, SGW 208, DNS 212, DNS database 214, base station 216, other network nodes 218, or any other node/device described and illustrated herein.

In various examples, the processor(s) 406 can be a central processing unit (CPU), a graphics processing unit (GPU), or both CPU and GPU, or any other type of processing unit. Each of the one or more processor(s) 406 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 402, which can be associated with types of volatile (RAM) and/or nonvolatile (ROM) memory.

The transceivers 408 can include modems, interfaces, antennas, Ethernet ports, cable interface components, and/or other components that perform or assist in exchanging wireless communications, wired communications, or both.

While the computing device need not include input/output devices 410, in some implementations it may include one, some, or all of these. For example, the input/output devices 410 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 410 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 410 can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

What is claimed is:

1. A system comprising:
one or more processors; and
a plurality of programming instructions implementing at least a first mobility management entity (MME) of a telecommunications network and a serving gateway (SGW) of the telecommunications network, the plurality of programming instructions, when executed by the one or more processors performing operations including:
receiving, by the first MME, a request associated with a user equipment (UE) and a tracking area code (TAC) of a base station connected to the UE;
querying, by the first MME, a domain name service (DNS) of the telecommunications network for an identification of the SGW, wherein the querying includes providing the TAC to the DNS;
receiving, by the first MME, the identification of the SGW based on the querying;
providing, by the first MME, the request to the SGW;
determining, by the SGW, that the first MME or a link between first MME and SGW has failed;
querying, by the SGW, the DNS for a list of MMEs in an MME pool that includes the first MME; and
selecting, by the SGW, a second MME from list of MMEs in the MME pool for a session with UE.

2. The system of claim 1, wherein the querying by the SGW occurs as part of a bootup procedure of the SGW.

3. The system of claim 1, wherein the querying by the SGW is responsive to a session setup or S11 link setup associated with the request.

4. The system of claim 1, wherein the querying by the SGW is responsive to the determining that the first MME or the link has failed.

5. The system of claim 1, wherein the operations further comprise receiving or retrieving all or part of the list of MMEs in the MME pool from the DNS.

6. The system of claim 1, wherein the operations further comprise retrieving the list of MMEs in the MME pool from a DNS database shared among multiple DNSs of the tele-communications network.

7. The system of claim 6, wherein a change to the list of MMEs in the MME pool is made to a copy stored in the DNS database.

8. The system of claim 1, wherein the operations further comprise storing, by the SGW, the list of MMEs in local cache of the SGW for a time-to-live (TTL) period associated with the list of MMEs.

9. A computer-implemented method comprising:

receiving from a first mobility management entity (MME) of an MME pool of a telecommunications network, by a serving gateway (SGW) of the telecommunications network, a request associated with a user equipment (UE);

subsequent to the receiving, determining, by the SGW, that the first MME or a link between first MME and SGW has failed;

querying, by the SGW, a domain name service (DNS) of the telecommunications network for a list of MMEs in the MME pool; and selecting, by the SGW, a second MME from list of MMEs in the MME pool for a session with UE.

10. The computer-implemented method of claim 9, wherein the querying by the SGW occurs as part of a bootup procedure of the SGW.

11. The computer-implemented method of claim 9, wherein the querying by the SGW is responsive to a session setup or S11 link setup associated with the request.

12. The computer-implemented method of claim 9, wherein the querying by the SGW is responsive to the determining that the first MME or the link has failed.

13. The computer-implemented method of claim 9, wherein the querying by the SGW receives or retrieves all or part of the list of MMEs in the MME pool from the DNS.

14. The computer-implemented method of claim 9, further comprising retrieving the list of MMEs in the MME pool from a DNS database shared among multiple DNSs of the telecommunications network.

15. The computer-implemented method of claim 9, further comprising storing, by the SGW, the list of MMEs in local cache of the SGW for a time-to-live (TTL) period associated with the list of MMEs.

16. A non-transitory computer storage medium having a plurality of programming instructions stored thereon that, when executed by a serving gateway (SGW) of a telecom-munications network cause the SGW to perform operations comprising:

receiving, from a first mobility management entity (MME) of an MME pool of a telecommunications network, a request associated with a user equipment (UE);

subsequent to the receiving, determining that the first MME or a link between first MME and SGW has failed;

querying a domain name service (DNS) of the telecom-munications network for a list of MMEs in the MME pool; and selecting a second MME from list of MMEs in the MME pool for a session with UE.

17. The non-transitory computer storage medium of claim 16, wherein the querying occurs as part of a bootup procedure of the SGW.

18. The non-transitory computer storage medium of claim 16, wherein the querying is responsive to a session setup or S11 link setup associated with the request.

19. The non-transitory computer storage medium of claim 16, wherein the querying is responsive to the determining that the first MME or the link has failed.

20. The non-transitory computer storage medium of claim 16, wherein the querying receives or retrieves all or part of the list of MMEs in the MME pool from the DNS.

\* \* \* \* \*